(12) United States Patent
Neuberger et al.

(10) Patent No.: US 10,422,487 B2
(45) Date of Patent: Sep. 24, 2019

(54) FIBER OPTIC LIGHT SOURCE

(71) Applicant: biolitec unternehmensbeteiligungs II AG, Vienna (AT)

(72) Inventors: Wolfgang Neuberger, Dubai (AE); Alexey Solomatin, Bonn (DE)

(73) Assignee: biolitec Unternehmensbeteiligungs II AG, Vienna (AT)

( * ) Notice: Subject to any disclaimer, the term of this patent is extended or adjusted under 35 U.S.C. 154(b) by 0 days.

(21) Appl. No.: 15/670,067

(22) Filed: Aug. 7, 2017

(65) Prior Publication Data

US 2018/0038560 A1 Feb. 8, 2018

Related U.S. Application Data

(60) Provisional application No. 62/371,737, filed on Aug. 9, 2016.

(51) Int. Cl.
*F21K 9/64* (2016.01)
*F21V 8/00* (2006.01)
(Continued)

(52) U.S. Cl.
CPC .............. *F21K 9/64* (2016.08); *G02B 6/001* (2013.01); *G02B 6/0003* (2013.01);
(Continued)

(58) Field of Classification Search
CPC ....... F21K 9/64; G02B 6/0006; G02B 6/0008; G02B 6/02076; G02B 6/4214;
(Continued)

(56) References Cited

U.S. PATENT DOCUMENTS 5,166,940 A * 11/1992 Tumminelli .......... H01S 3/0675
372/6
6,272,269 B1 * 8/2001 Naum .................. G02B 6/0026
362/551
(Continued)

FOREIGN PATENT DOCUMENTS

JP        2004288840 A   * 10/2004

*Primary Examiner* — Seung H Lee
(74) *Attorney, Agent, or Firm* — BJ Associates; Bolesh J Skutnik (57) ABSTRACT

A fiber optic light source in which input light with short and narrow band wavelength is converted/transformed into multi-band visible white light with high intensity output power is provided. The new light source comprises at least one homogenizing light guide element, and at least one photoluminescence element. It may also comprise at least one input element and an optical fiber. All or some of the elements may be integrated into an optical waveguide. In some embodiments, the at least one input element increases light transfer efficiency from a ray source to the at least one homogenizing light guide element component of the fiber optic light source. The at least one photoluminescence element can be a point or an extended form like a line or surface. The fiber optic light source output beam may also contain the input ray wavelength, which in turn can be from a fiber optic laser. In operation, an input ray travels through at least one homogenizing light guide element and irradiates at least one photoluminescence element present in preselected positions of the device to cause large area or spacious illumination at a desired target. This source can be an information source to communicate information through light modulation not noticeable to the naked human eye. Information is sent from the optical light source to information receivers, technical devices like smart phones, TV-Displays, or other devices, which could replace the common use of LAN or WLAN networks. Here a known luminescent (Continued)

detector can be used to efficiently collect the information in its optical form and to lead it to a suitable photo detector. This enables free-space optical light information transfer especially in areas where traditional infrastructure using transmitting fibers is difficult to establish.

19 Claims, 5 Drawing Sheets

(51) Int. Cl.
| | |
|---|---|
| *G02B 6/02* | (2006.01) |
| *G02B 6/42* | (2006.01) |
| *H04B 10/114* | (2013.01) |
| *H04B 10/116* | (2013.01) |
| *H01S 3/067* | (2006.01) |
| *G02B 27/09* | (2006.01) |

(52) U.S. Cl.
CPC ......... *G02B 6/0006* (2013.01); *G02B 6/0008* (2013.01); *G02B 6/02076* (2013.01); *G02B 6/421* (2013.01); *G02B 6/4214* (2013.01); *H04B 10/114* (2013.01); *H04B 10/116* (2013.01); *G02B 6/0208* (2013.01); *G02B 27/0994* (2013.01); *H01S 3/067* (2013.01)

(58) Field of Classification Search
CPC ...... G02B 6/001; G02B 6/0003; G02B 6/421; G02B 27/0994; G02B 6/0208; H01S 3/067; H04B 10/116; H04B 10/114
USPC .......................................................... 362/553
See application file for complete search history.

(56) References Cited

U.S. PATENT DOCUMENTS

| | | | | |
|---|---|---|---|---|
| 7,066,601 | B2 * | 6/2006 | Lee .................... | G02B 27/0994 349/62 |
| 2007/0187580 | A1 * | 8/2007 | Kykta .................. | G02B 27/017 250/227.15 |
| 2007/0297190 | A1 * | 12/2007 | Ng ........................ | A61N 5/0601 362/558 |
| 2010/0254153 | A1 * | 10/2010 | Hama .................. | A61B 1/0653 362/551 |
| 2012/0148207 | A1 * | 6/2012 | Li ....................... | G02B 6/02042 385/124 |
| 2014/0092620 | A1 * | 4/2014 | Tissot .................. | G02B 6/0003 362/553 |

* cited by examiner

FIBER OPTIC LIGHT SOURCE

CROSS REFERENCE TO PRIORITY APPLICATION

This patent application claims priority to U.S. provisional patent application No. 62/371,737, filed on Aug. 6, 2016, entitled "Fiber Optic Light Source" by Neuberger et al., which is expressly incorporated by reference in its entirety as part of the present disclosure.

BACKGROUND OF THE INVENTION

Field of the Invention

The present invention relates to fiber optic light sources. More particularly, the invention relates to solid state light sources in which laser light with a short and narrow band wavelength is efficiently converted into multi-band, visible light with high intensity output power.

Invention Disclosure Statement

Incandescent bulbs have been in use for many years. These have been the primary electrical lighting choice producing a trademark yellow glow for generation after generation. In recent years, however, there has been a steady decline in sales of incandescent bulbs, primarily due to the development of compact fluorescent lights and now most recently, LEDs. LEDs are made up of a material called a semiconductor. When an electrical current is passed through this solid material, its individual atoms become excited and release energy in the form of light. LEDs produce little or no heat compared to incandescent bulbs and LEDs consume only a fraction of the electricity of an incandescent bulb.

The next generation of lighting may originate from a different type of solid-state lighting device. Solid state lasers exhibit excellent beam quality and produce the highest repetition rates. Solid state lasers require little maintenance and can emit infrared (IR), visible and ultraviolet (UV) wavelengths. Diode pumped solid state lasers clearly improve lifetime, maintenance costs, uptime and efficiency in comparison with flash lamp pumped lasers. Furthermore, the shorter pulse duration of diode-pumped lasers reduces slag and other deposits that are difficult to remove.

Solid state lighting refers commonly to light emitted by solid-state electroluminescence, as opposed to incandescent bulbs or fluorescent tubes. Compared to incandescent lighting, solid state lighting creates visible light with reduced heat generation or parasitic energy dissipation. Most common white LEDs convert blue light from a solid-state device to an approximate white light spectrum using photoluminescence.

There are two primary methods to create white light from a laser source. The first method called laser array method which combines three primary colors of additive light—red, green, and blue to make a white laser. This method requires power to be supplied to each individual diode and accurate optics to line up the three different lasers. Also, in terms of illumination applications, it is potentially dangerous to the human eye to utilize. The second method, called the laser-phosphor method, utilizes only a blue laser and a yellow phosphor. The scattering of the laser and the emission of yellow light from the laser hitting the phosphor will together be perceived as white light. At this point, the light can no longer be technically called a laser because it is no longer monochromatic and the divergence angle of the light is very wide. Therefore, it is considered safer to utilize the laser-phosphor method rather than the laser array.

There exist attempts to use optical fiber for better transfer of initialized light to a phosphor emission element. A light source has been provided with a conversion element, in which at least a portion of a primary radiation emitted by a semiconductor light source is wavelength-converted. As an example, in U.S. Pat. No. 7,959,338 by Kazakevich describes a solid-state light source which includes a semiconductor light source and a fiber optic element in aggregate providing an illumination path. U.S. Pat. No. 7,706,053, Moosburger discloses a light source with a conversion element, in which at least a portion of a primary radiation emitted by a semiconductor light source is wavelength-converted. U.S. Published Application 20140185269 A1 by Li discloses photoluminescence wavelength conversion components for solid-state lamps (bulbs) with an omnidirectional emission pattern. However, none of these devices are safe for eyes. Further, these devices do not provide adequate efficiency. The present embodiment addresses these needs.

There is, therefore a need for a device that would convert laser light with short and narrow band wavelength into multi-band visible white light with high intensity output power. It should be a small and efficient device, safe for the human eye. The present embodiment addresses these needs.

OBJECTIVES AND BRIEF SUMMARY OF THE INVENTION

It is an objective of present invention to provide a fiber optic light source which converts light beam of short wavelength to longer and multi-band visible light.

It is also an objective of present invention to provide a fiber optic light source which provides balanced equable light output by uniform initialized beam in short distance.

It is also an objective of present invention to provide a fiber optic light source which uses visible light better in fiber optic application.

It is another objective of present invention to provide a very small, efficient and high-intensity visible light source for better adaptation in focusing systems.

It is still another objective of present invention to provide visible light with high-intensity output power.

It is yet another objective of the present invention to provide a fiber optic light source which transmits information through light modulation not noticeable to the naked human eye, Visible Light Communication (VLC).

Briefly stated, a fiber optic light source in which input light with short and narrow band wavelength is converted/transformed into multi-band visible white light with high intensity output power is provided. The new light source comprises at least one homogenizing light guide element, and at least one photoluminescence element. It may also comprise at least one input element and an optical fiber. All or some of the elements may be integrated into an optical waveguide. In some embodiments the at least one input element increases light transfer efficiency from a ray source to the at least one homogenizing light guide element component of the fiber optic light source. The at least one photoluminescence element can be a point or an extended form like a line or surface. The fiber optic light source output beam may also contain the input ray wavelength, which in turn can be from a fiber optic laser. In operation, input ray(s) travel through at least one homogenizing light guide element and irradiate at least one photoluminescence element present in preselected positions of the device to cause large area or spacious illumination at a desired target. This source can also be an information source, communicating through light modulation unnoticeable to the naked human eye. Information is sent from the optical light source to information receivers, technical devices like smart phones TV-Displays, or other devices, which could replace the common use of LAN or WLAN, even long distance networks. Here a known luminescent detector, information receiver can be used to efficiently collect the information in its optical form and to lead it to a suitable photo detector. This enables free-space optical light information transfer especially in areas where traditional infrastructure using transmitting fibers is difficult to establish.

The above and other objects, features and advantages of the present invention will become apparent from the following description read in conjunction with the accompanying drawings.

DETAILED DESCRIPTION OF PREFERRED EMBODIMENTS

Present invention provides a fiber optic light source in which light with short and narrow band wavelength is converted into wide multi-band visible white light with high intensity output power. The fiber optic light source comprises at least one optical waveguide having at least one homogenizing light guide element, and at least one photoluminescence element. The homogenizing light guide element is an element capable of generating, provoking or producing a homogenous and uniform electromagnetic radiation beam while at the same time guiding and/or containing the electromagnetic waves, acting as a waveguide, wherein a homogenous and uniform electromagnetic radiation beam is a radiation beam whose flux of radiation per unit area varies less than 50%, preferably less than 30%, 20% or 10% over the cross sectional area of the waveguide if measured at a spatial resolution that is smaller than a tenth of the cross sectional area of said cross sectional area. Such a homogenizing element may comprise a radiation scattering component or an optical fiber which comprises along its optical axis a section for randomizing the optical rays of the radiation beam, for instance a section having a non-circular or non-rectangular cross section of the core and/or cladding layer, or any other means that is effective in decreasing the angular divergence of the beam while increasing the effective cross section of the beam, for instance a beam collimating optical element. A radiation source delivers radiation with short and narrow band wavelength to the fiber optic light source. The input radiation is homogenized by the homogenizing light guide element whereas the photoluminescence element completely or partly converts the short wavelength light beam through photoluminescence to longer and wider visible white light. The homogenizing light guide element could be an optical fiber section featuring a core cross-section with arbitrary geometry, such as a round, circular, elliptical, rectangular, squared, hexagonal or octogonal shaped core.

In a preferred embodiment, the optical waveguide is an optical fiber and the input radiation source which emits the input beam is a laser radiation source or a fiber laser. The homogenization can also be achieved by classical optical elements like prisms or lenses. In another embodiment, the fiber optic light source further comprises one or more input elements for increasing light transfer efficiency from one or more radiation sources to at least one homogenizing light guide element. In general, for lighting applications and to provide an eye-safe radiation the input beam that enters the fiber optical light source has a short wavelength, such as laser light, and after passing through the various elements, emits an output beam having a longer and multi-band visible white light. In other embodiments, the output beam also contains the wavelength of the input beam, and both are emitted together. Yet, in other embodiments, the input beam is generated by a fiber laser, and the output beam has a high intensity output power. Also for illumination, in other embodiments the initial beam is transmitted through an optical waveguide and illuminates a photoluminescent element along the length of the optical waveguide evenly or according to certain specifications.

In another embodiment, the optical waveguide integrates the at least one photoluminescence element and the at least one homogenizing light guide element transporting the input radiation from the at least one homogenizing guide element to the at least one photoluminescence element. In the fiber optic light source, the input radiation is led through at least one homogenizing light guide element and irradiates at least one photoluminescence element on certain places for realization of large area or spacious illumination.

In preferred embodiments, the fiber optic light source converts laser light with short and narrow band wavelength into multi-band, essentially visible white light with high intensity output power. In operation, light modulation can be used to provide VLC (Visible Light Communications), using modulations invisible to a naked eye, to substitute for LAN and WLAN networks. Here a luminescent detector can be advantageously used to efficiently collect the information in its optical form and to lead it to a suitable photo detector.

Figure 1:
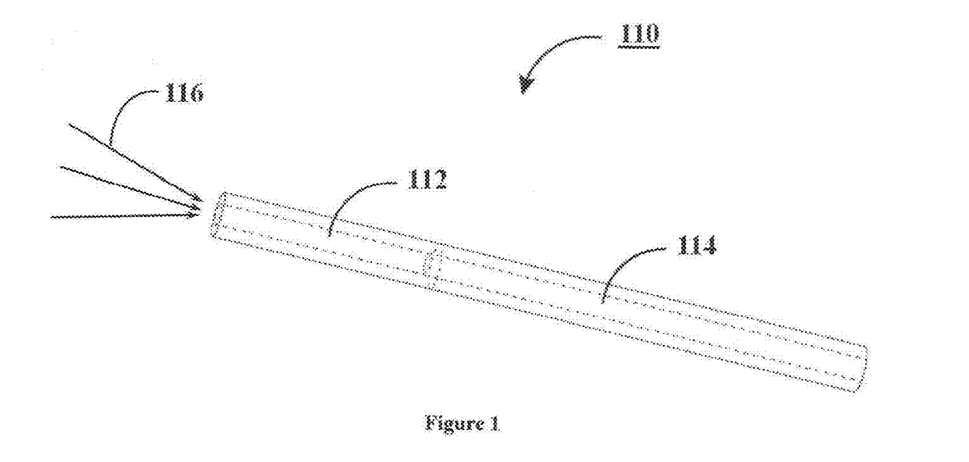
FIG. 1 shows a preferred embodiment of the present invention illustrating a fiber optic light source.

FIG. 1 shows a preferred embodiment of the present invention illustrating fiber optic light source 110 which performs a homogenization of the input radiation, as well as its partial or complete conversion through photoluminescence. Fiber optic light source 110 comprises an optical waveguide having at least one homogenizing light guide element 112 to perform a homogenization of the input radiation; and at least one photoluminescence element 114 which transports input radiation 116 from at least one homogenizing light guide element 112 to at least one photoluminescence element 114.

Figure 2:
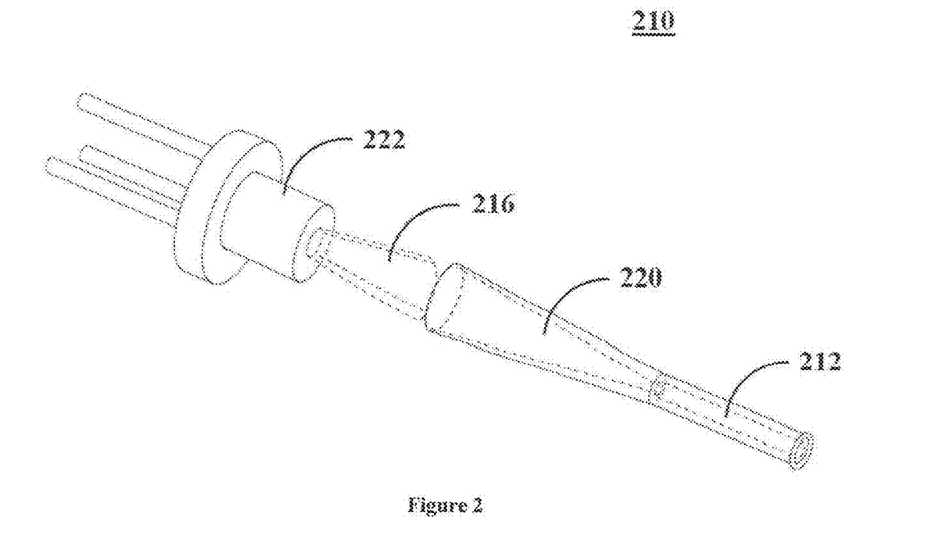
FIG. 2 represents a side perspective view of a preferred embodiment of the present invention illustrating the fiber optic source with an input light source.

FIG. 2 represents a side perspective view of another preferred embodiment of present invention illustrating fiber optic source 210 receiving input radiation 216 from input radiation source 222 through input element 220 to increase light transfer efficiency from input radiation source 222 to homogenizing light guide element 212.

Alternatively, the input element is integrated to the homogenizing light guide element or both are molded as a single element, so that that the design of the input element also allows homogenization of the input radiation. The single element combining both features can be a homogenizing taper, which guides the input radiation to the photoluminescence element.

In another embodiment, the input element, the homogenizing light guide element and the photoluminescent element of the fiber optic light source are implemented or molded as a single element, preferably an optical waveguide, such as an optical fiber.

The homogenizing light guide element has a core cross section with arbitrary geometry, such as a round, circular, elliptical, rectangular, squared, hexagonal or octogonal shaped core.

Figure 3:
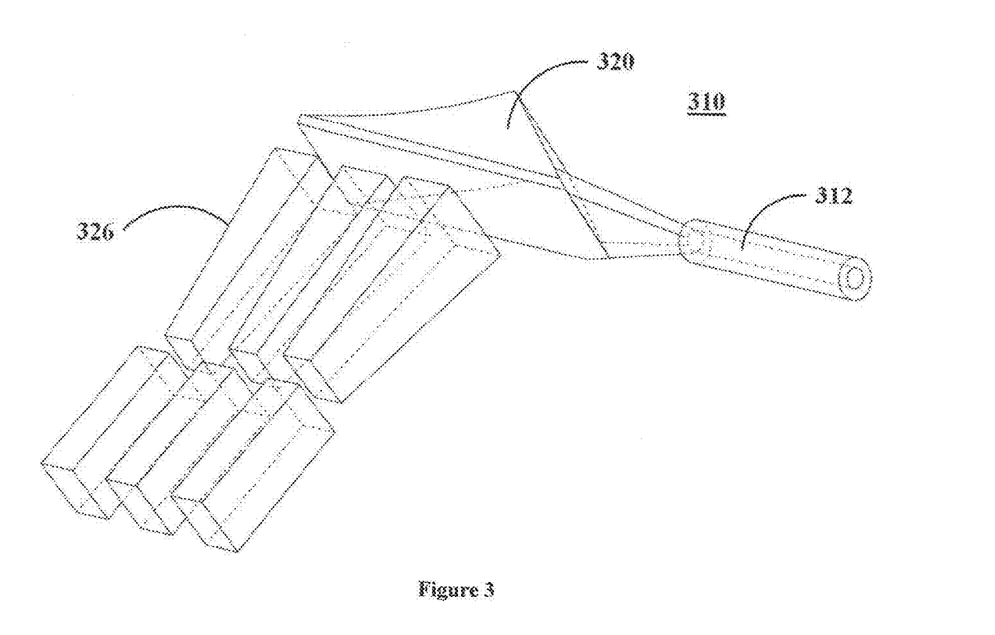
FIG. 3 represents a side perspective view of a preferred embodiment of the present invention illustrating the fiber optic source having at least one input element with a plurality of light inputs.

FIG. 3 represents a side perspective view of another preferred embodiment of the present invention illustrating fiber optic source 310 having at least one input element 320 with a plurality of light inputs 326. In fiber optic source 310, at least one homogenizing light guide element 312 allows homogenized light to lead through. The input element is preferably an optical input element, such as a lens or a bundle of optical fibers. The input element can be placed in front of the homogenizing element, it can be optically coupled, or it can be advantageously integrated into the optical waveguide that comprises the fiber optic light source. In another embodiment, the input element is a taper.

Figure 4:
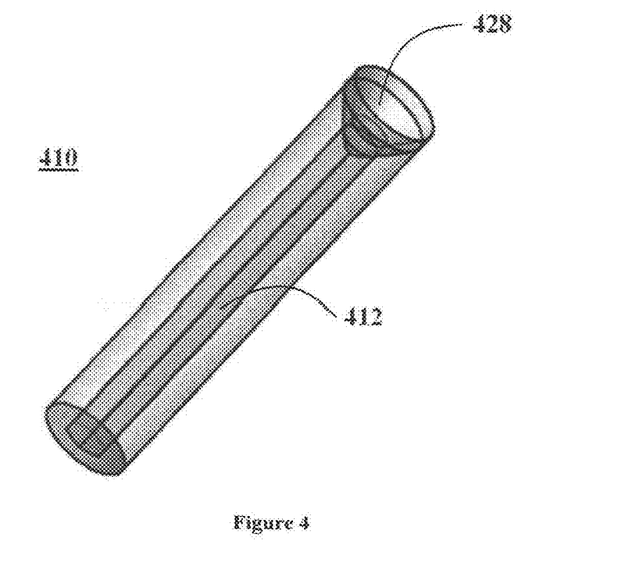
FIG. 4 illustrates another preferred embodiment of the fiber optic source having a mirror coupled to the photoluminescence element.

In another embodiment shown in FIG. 4, fiber optic source 410 has at least one reflecting element 428, such as a mirror, attached to photoluminescence element 412 to inhibit backlight of photoluminescence element 412. After the input radiation passes through the homogenizing element (not shown) having a short and narrow band wavelength, it enters the photoluminescence element 412 where the input radiation is converted into diffused or scattered visible light with wide band wavelength. The reflecting element is used to reflect, guide or route all or parts of the scattered light beams. The reflecting element may have different forms or shapes such as flat, conical, parabolic etc. The reflecting element can also be a reflector constructed in the optical fiber, known as a fiber Bragg grating.

Figure 5A:
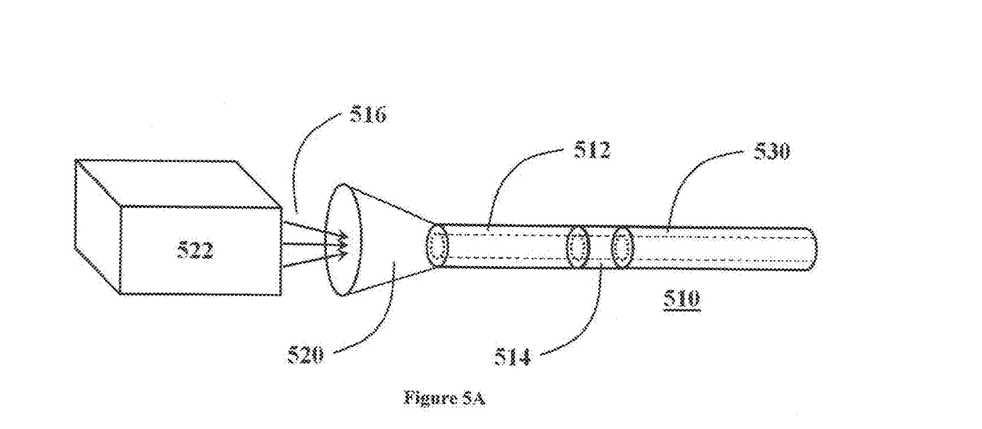
FIG. 5A illustrates another preferred embodiment of the fiber optic source having at least one homogenizing light guide element and at least one photoluminescence element coupled to an optical fiber.

The device can be used in many applications, for example, providing a predetermined illumination pattern to an area and thus improving its aspect or having a physiological effect on the people occupying it FIG. 5A illustrates fiber optic source 510, wherein input radiation 516 emitted from input source 522, is led through input element 520 to homogenizing light guide element 512, which homogenizes input radiation 516 and then guides it to photoluminescent element 514. To illuminate a desired space, optical waveguide 530, such as an optical fiber, is optically coupled to photoluminescent element 514 or integrated to it, so that visible light is transmitted through it and guided to an area to be illuminated. In FIG. 5A, the homogenized light has already passed the photoluminescent element and an optical fiber element guides the output visible light of white light.

Figure 5B:
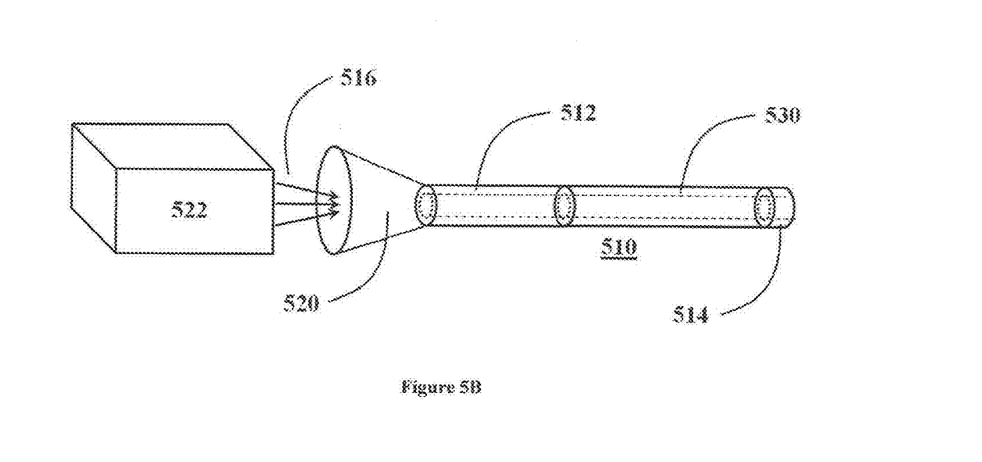
FIG. 5B illustrates another preferred embodiment of the fiber optic source in which the photoluminescence element is integrated to an end of an optical fiber.

In yet another embodiment, shown in FIG. 5B, fiber optic source 51Q has at least one photoluminescence element 514 integrated to or at an end of optical fiber 530 which transports input ray 516 from at least one homogenizing light guide element 512 to at least one photoluminescence element 514, which may be one or more points (dots) or an extended form like a line or a surface. The output beam of optical waveguide 530 has the wavelength of input ray 516 homogenized after passing homogenizing light guide element 512. The input ray 516 is led through optical fiber 530 and irradiates at least one photoluminescence element 514 on certain places for realization of large area or spacious illumination. In this embodiment, the homogenized light is transmitted through the optical fiber to further sections of the optical fiber having at its end a photoluminescent element, so that the homogenized light of short band wavelength travelling through the optical fiber is diffused or scattered once it arrives to the photoluminescent element to emit light of multi-band wavelength white at a desired area.

The embodiment, shown in FIG. 5A or FIG. 5B illustrates only one input source 522, one input element 520 and one homogenizing light guide element 512 at one input end of the optical fiber 530. Since optical fiber 530 has more than one input surface in other embodiments input rays can enter fiber 530, e.g. from both ends. In this case a homogenizing light guide element 512 and an input element 520 would be situated on each end of optical fiber 530. Having input rays entering from different directions would be useful in reducing thermal gain in input elements for higher power output designs. This can also be extended to multiple entries of input radiation along a fiber section.

Figure 6:
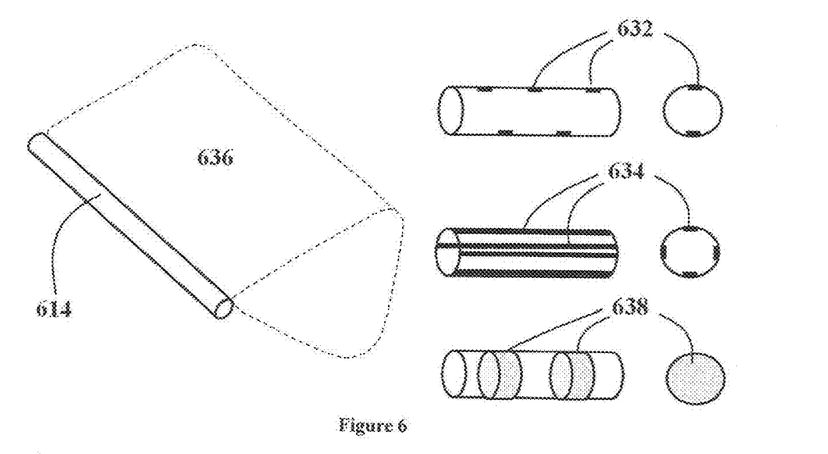
FIG. 6 illustrates another preferred embodiment of the fiber optic source wherein the photoluminescence elements have different patterns/shapes.

In another embodiment, shown in FIG. 6, photoluminescence element 614 of fiber optic source comprises one or more points (dots) 632, an extended form like a line 634, a surface 636 or defined sections 638. The selection of a determined photoluminescence element is used to control the extent, type and/or shape of illumination. An optical waveguide guides the homogenized input radiation to these photoluminescence elements along its length, so visible light is directed to the areas to be illuminated evenly or according to certain specifications. Also, one or more optical waveguides are used, to create a network so that photoluminescent elements located in specific positions emit visible light, in order to achieve an extensive area or space illumination. In some cases, the photoluminescence elements are integrated to the optical waveguides. In other embodiments, the photoluminescent elements are connected to/disconnected from the optical waveguides. In addition, it is possible to also perform a light emission control of the input radiation emitted from the optical waveguide through changes in the cladding, geometry, refraction index, output power of the optical waveguide and/or because of diffusion in the core of the optical waveguide. In some embodiments, the optical waveguide has a first end connected to the homogenizing light guide element and the other end connected to the photoluminescence element. The input radiation is homogenized after passing the homogenizing light guide element, guided by the optical waveguide to the photoluminescence element, where visible light illuminates desired areas. In other embodiments, the optical waveguide guides the homogenized input radiation as well as the input radiation without being homogenized, and guides both to the photoluminescence elements and/or to the areas to be illuminated.

Figure 7:
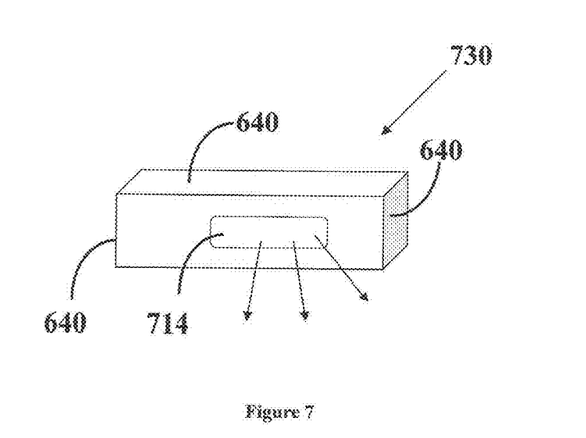
FIG. 7 illustrates another preferred embodiment of the fiber optic source having an optical fiber with a planar structure.

In another preferred embodiment shown in FIG. 7, optical fiber 730 has a planar structure with a plurality of edges 640. In some embodiments, the plurality of edges 640 of optical fiber 730 are mirror coated. The irradiation of at least one photoluminescence element 714 occurs in at least one place of the planar structure so that light is emitted through illuminated patterns. In other embodiments, the input radiation of fiber optic source enters at least one place of planar structure and has more than one transformation.

Figure 8:
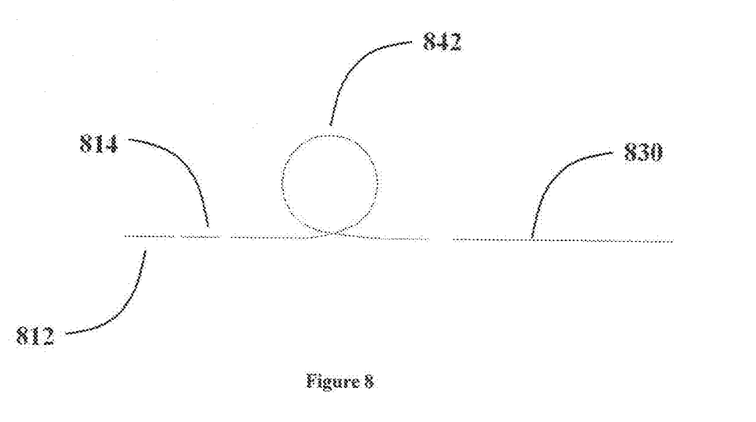
FIG. 8 illustrates another preferred embodiment of the fiber optic source wherein the output radiation is further amplified.

In another preferred embodiment, shown in FIG. 8, the transformed light which has been homogenized by homogenizing light guide element 812 and guided through photoluminescence element 814, is further amplified through fiber laser 842 and then transported/guided through optical fiber 830.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A fiber optic light source for converting an input beam from a short wavelength laser radiation source to longer wavelength broad visible light, said source comprising an optical fiber, at least one laser radiation source; at least one homogenizing light guide element to perform homogenization of input radiation; and at least one photoluminescence element; wherein the homogenizing element and the photoluminescence element are integrated into the optical fiber and whereby said at least one photoluminescence element converts at least parts of said input laser radiation through photoluminescence to transformed multi-band visible white light.

2. The fiber optic light source according to claim 1, wherein said fiber optic light source further comprises at least one input element.

3. The fiber optic light source according to claim 2, wherein said at least one input element is integrated in said optical fiber guide.

4. The fiber optic light source according to claim 2, wherein said at least one input element is a taper.

5. The fiber optic light source according to claim 1, wherein said at least one homogenizing light guide element possesses a cross section core with geometry selected from the group consisting of round, circular, elliptical, rectangular, squared, hexagonal or octagonal.

6. The fiber optic light source according to claim 1, wherein said fiber optic light source further comprises at least one reflecting element attached to said photoluminescent element, which reflects, guides or routes part or all of the scattered or diffused radiation from said photoluminescent element.

7. The fiber optic light source according to claim 6, wherein the shape of said reflecting element is selected from flat, conical and parabolic.

8. The fiber optic light source according to claim 6, wherein said reflecting element is a fiber Bragg grating.

9. The fiber optic light source according to claim 6, wherein said reflecting element is a mirror.

10. The fiber optic light source according to any one of claim 1 to 2, wherein said transformed light may be further transmitted through an optical waveguide.

11. A fiber optic light source for converting an input light beam from short wavelength laser radiation source to longer wavelength broad visible light, said source comprising:
    a laser radiation source;
    an optical fiber;
    at least one homogenizing light guide element; and
    at least one photoluminescence element integrated with said at least one homogenizing light guide element in said optical fiber;
    wherein said at least one photoluminescence element radiates an output beam of multi-band visible white light through said at least one homogenizing light guide element evenly.

12. The light source according to claim 11, wherein the output beam of said fiber optical light source possesses the wavelength of said input light beam.

13. The light source according to claim 11 wherein said input light beam is from a fiber optic laser.

14. The light source according to claim 13, wherein said input light beam is led through said at least one homogenizing light guide element evenly.

15. The light source according to claim 13, wherein said input light beam is led through said at least one homogenizing light guide element and irradiates said at least one photoluminescence element to illuminate an extensive space.

16. A method for a fiber optic source to convert an input light beam of a short wavelength laser radiation source into a longer wavelength multi-band visible white light, the method comprising the steps of:
    (a) leading an input ray through at least one homogenizing light guide element;
    (b) transporting said input ray from said at least one homogenizing light guide element to an at least one photoluminescence element;
    (c) irradiating said at least one photoluminescence element; and
    (d) thereby converting said input ray with short wavelength into a multi-band visible light with high intensity output power.

17. The method according to claim 16, wherein said at least one homogenizing light guide with a planar structure has a plurality of mirrored edges.

18. The method according to claim 16, wherein said at least one photoluminescence element is irradiated in at least one place of a planar surface of said at least one homogenizing light guide element.

19. The method according to claim 17, wherein said input ray enters in said at least one place of said planar structure.

* * * * *